[11] 3,589,174

[72] Inventor Bauke S. S
 The Geleen, Netherlands
[21] Appl. No. 758,422
[22] Filed Sept. 9, 1968
[45] Patented June 29, 1971
[73] Assignee Stamicarbon N.V.
 Heerlen, Netherlands
[32] Priority Sept. 8, 1967
[33] Netherlands
[31] 6,712,322

[54] APPARATUS FOR MEASURING THE DAMPING OF VIBRATIONS IN VISCO-ELASTIC MATERIALS
2 Claims, 6 Drawing Figs.

[52] U.S. Cl. .................................................... 73/70.1
[51] Int. Cl. .................................................... G01d 9/00
[50] Field of Search ........................................ 73/67.2, 71.3, 70.1

References Cited
UNITED STATES PATENTS

| | | | |
|---|---|---|---|
| 2,193,079 | 3/1940 | Schrader | 73/70.1 |
| 2,871,693 | 2/1959 | Navratil | 73/70.1 X |
| 3,105,381 | 10/1963 | Collette | 73/70.1 X |
| 3,316,759 | 5/1967 | Rehder | 73/71.3 X |

*Primary Examiner*—Richard C. Queisser
*Assistant Examiner*—Arthur E. Korkosz
*Attorney*—Cushman, Darby & Cushman

ABSTRACT: An apparatus is disclosed for measuring the damping of vibrations in visco-elastic materials, such as non-vulcanized, slightly cross-linked rubbers, the apparatus having a moveable arm in communication with the elastic material and carrying a scale attached thereto, the scale having a set of logarithmic graduations in which the interval between each two successive graduation marks is directly proportional to the distance to the zero point. The apparatus is also provided with a counting means for determining the decrease in the number of graduation marks passed in successive vibration periods.

3,589,174

APPARATUS FOR MEASURING THE DAMPING OF VIBRATIONS IN VISCO-ELASTIC MATERIALS

The invention relates to an apparatus for measuring the damping of vibrations in visco-elastic materials, the said apparatus being provided with a scale and an indicator for indicating the amplitude of the vibrations of a movable part of the apparatus which is to be connected with the test specimen of the material to be examined.

In a known apparatus of this type the indicator consists of a stylus which is connected with the test specimen and coacts with a rotary drum on which the scale is provided. The logarithmic decrement and the frequency of the vibration can be determined from the record by measurement and calculation, but this is a very laborious and exacting operation, which can only be executed by experts.

The aim of the invention is to provide an apparatus which yields directly readable values for the damping and frequency of the vibration. To this end the scale is provided on either side of a zero point with a set of logarithmic graduations in which the interval between each two successive graduation marks is directly proportional to the distance to the zero point, while the apparatus furthermore comprises a counting mechanism for determining the decrease of the number of graduation marks passed in successive vibration periods, or parts thereof.

If the distance from a given graduation mark to the zero point is $a$ and the distance from the following graduation mark to the zero point is $pa$, where $p$ denotes a constant with a value slightly greater than unity, the distances from the successive graduation marks in the range to the zero point will be $a, pa, p^2a, p^3a \ldots p^na, p^{n+1}a \ldots$.

When the movable part of the apparatus travels from the zero point to a given amplitude $A_1$ and back, the counting mechanism will record a pulse train the number of pulse in which equals $2n_1$. Hence, $$A_1 = p^{n_1}a$$

When, subsequently, the movable part deflects towards the other side of the zero point, the damping produced by the test specimen will narrow the amplitude to, say $A_2$ so that in the second half of the cycle $2n_2$ pulses will be recorded:

$$A_2 = p^{n_2}a$$

By definition, the logarithmic decrement $\Lambda$ equals $\Lambda = \ln A_1/A_3$ where $A_3$ denotes the amplitude of the third half cycle, or the second half cycle on the same side of the zero line.

$\ln A_1/A_2 = \tfrac{1}{2}\Lambda$, since $\Lambda = \ln A_1 - \ln A_3 = 2(\ln A_1 - \ln A_2)$.

$\tfrac{1}{2}\Lambda = \ln A_1 - \ln A_2 = \ln p^{n_1}a - \ln p^{n_2}a$ $\tfrac{1}{2}\Lambda = \ln a + n_1 \ln p - \ln a - n_2 \ln p = (n_1 - n_2) \ln p$.

Since the counter mechanism can count $2(n_1-n_2)$ pulses, application of a suited circuit with a bidirectional counting system in which the number of pulses is multiplied by $\ln p$, permits the number of pulses to be directly read.

The length of the distance $a$ drops out of the equation. In consequence, this length is important only with regard to the measuring threshold, which is defined by it.

This means that an, anyhow, impracticable, portion of the scale on either side of the zero point can be omitted.

The invention is particularly suited for measuring torsional vibrations. A known apparatus for measuring torsional vibrations in visco-elastic materials is provided with clamps for holding the test specimen on either end, one of said clamps being connected with an indicator arm which, unlike the other one, is adapted to rotate freely. In the application of the invention this known apparatus can be considerably improved by having the arm carry the scale, the successive graduation marks in which allow the light from a light source to fall upon a light detector connecting with a counter circuit.

These graduation marks can be made so narrow as to be hardly visible by the naked eye. As will be made clear below, it is recommendable to increase the width of the graduation marks with the distance to the zero point, preferably in direct proportion to said distance.

The accuracy of the digital measurement will thereby be improved. The invention will now be elucidated with reference to the drawing, but is not restricted to the embodiment illustrated therein.

Figure 1:
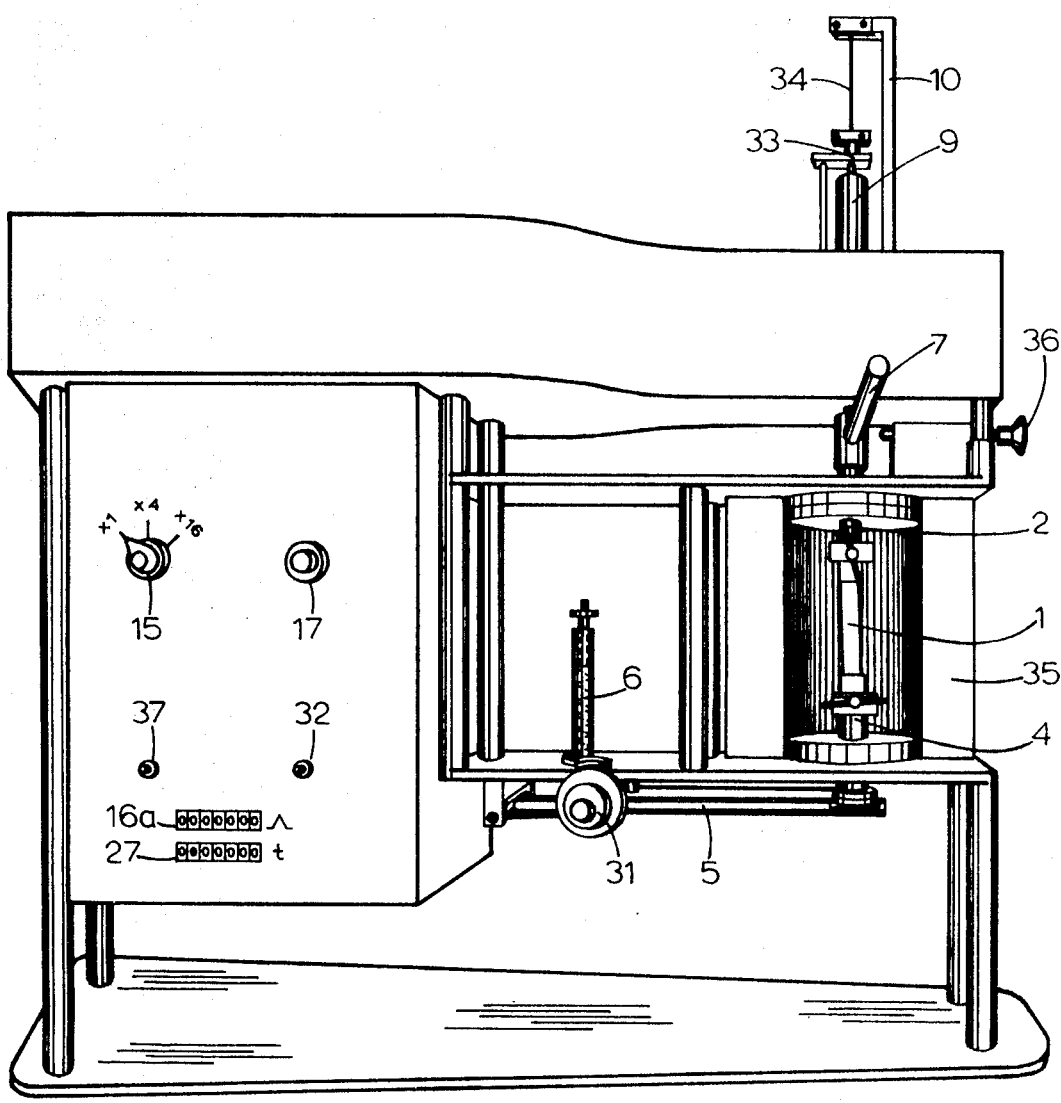
FIG. 1 shows a perspective side view of a meter for measuring the damping of torsional vibrations.
Figure 3:
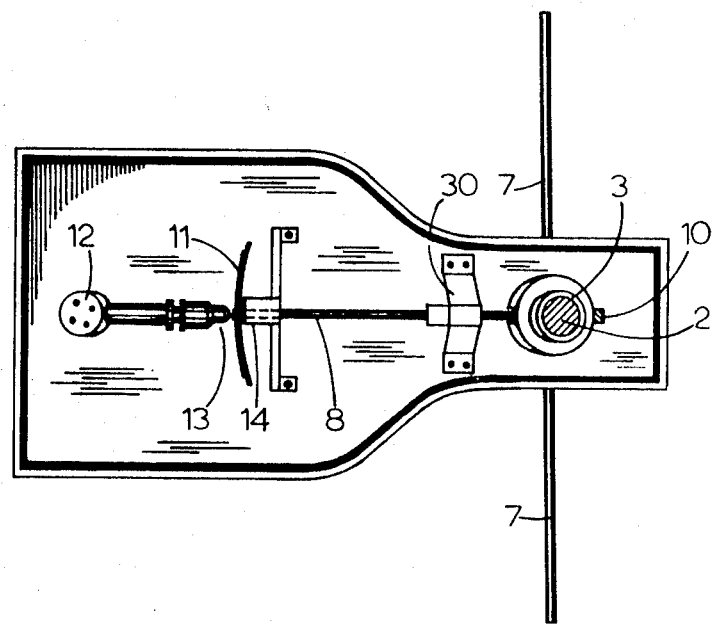
FIG. 3 is a top view of the meter according to FIG. 1 with removed cover and upper structure.

A test strip 1 (FIG. 1) of the material to be examined is clamped with its upper end to a shaft 2 suspended in air-cushioned bearing 3 (FIG. 3). The lower end of the strip is clamped in holder 4, which is free to move vertically on a hingeable arm 5, the effective weight of which can be varied by means of an adjustable spring mounted in a holder 6.

An inertia arm 7, an indicator arm 8 (FIG. 3) a drive 9 and a bracket 10 are rigidly connected with shaft 2.

Figure 2:
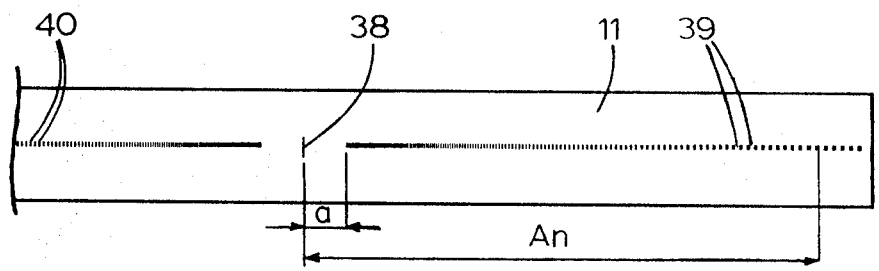
FIG. 2 shows a logarithmic scale for said meter.

The end of indicator arm 8 carries a scale 11 (FIGS. 2 and 3). Except for a small part $a$, said scale is provided, on either side of a zero point 38, with a light-transmitting graduation marks 40 of such a width that the expression $A_n = p^n a$ is valid for the boundary lines of the graduation marks. Consequently, the same holds for the nontransmitting parts 39.

Figure 5:
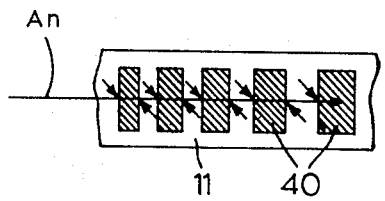
FIGS. 5 and 6 show the principles of two scale designs.
Figure 6:
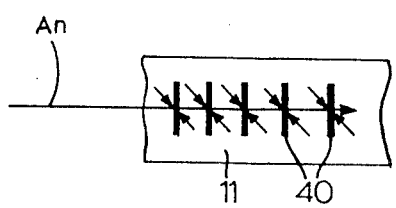

So, in this embodiment the graduation marks are not equally wide, as in the case illustrated in FIG. 6, but their width increases with the distance to the zero point, as is shown in FIG. 5 and FIG. 2.

By means of an objective 13, an image of the filament of a lamp 12 is projected on scale 11, with the result that a stationary phototransistor 14 placed immediately behind the scale is illuminated every time the filament image falls upon a light-transmitting graduation mark.

Consequently, when the filament projection passes the first boundary line of a light-transmitting graduation mark, a pulse is transmitted by the phototransistor. In FIG. 5 the passing points for the forward movement of the projection are indicated by downward arrows above the projection line of amplitude $A_n$, and those for the reverse movement of the projection by upward arrows below this line. Comparison shows that an embodiment according to FIG. 5 is preferable to that in FIG. 6, because the jumps in the digital representation of the amplitude correspond to one pulse, whereas in the embodiment according to FIG. 6 these jumps practically correspond to two pulses.

With low degrees of damping it is preferable to add the pulse trains of one or two cycles, and then subtract the pulse of one or two following cycles.

In the former case this gives $2(n_1 + n_2 - n_3 a / n_4)$, or, with $n_2 = n_1 - x$:

$2\{n_1 + (n_1 - x) - (n_1 - 2x) - (n_1 - 3x)\} = 8x$

As already shown above $\Lambda$ can be directly read if the number of pulses counted equals $2(n_1 - n_2)$, i.e. $2x$. Hence, the result must be divided by 4 to give the value for $\Lambda$.

If the summation and subtraction are each carried out over two periods, it can be shown in a similar way that the number of pulses counted equals $32x$. This means that the result must be divided by 16.

In view of practical considerations, however, it is more recommendable, to multiply than to divide. The counter circuit is then so arranged that a measurement made over four cycles immediately yields the correct value. If the measurement is carried out over two cycles, the result must be multiplied by 4, while if it is done over one cycle a multiplication factor of 16 must be used. The number of cycles can be chosen by means of a control knob 15. The multiplication factor is indicated against each of the three settings.

Figure 4:
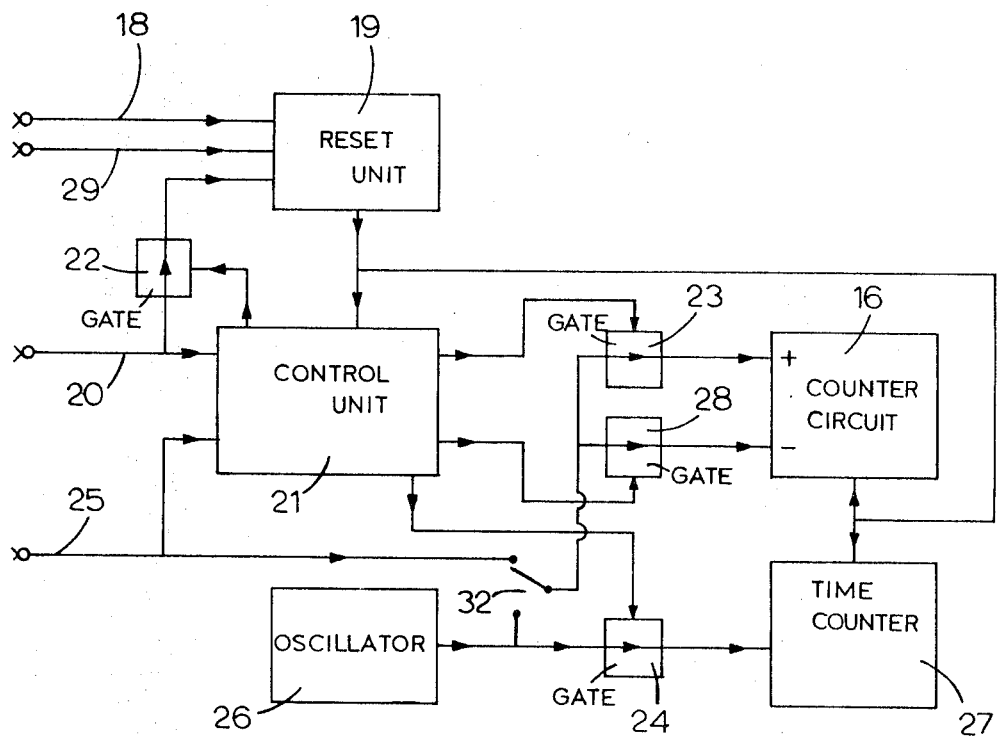
FIG. 4 is a block diagram of the meter.

At the start of a measurement counter 16a is set to zero by means of a pushbutton 17, which feeds a pulse to a reset unit 19 via a line 18 (FIG. 4). The arm 8 is now moved out of the equilibrium position. The moment zero point 38 is passed, a pulse from phototransistor 14 is fed to a control unit 21 via a line 20. The control unit opens the gates 22, 23, and 24.

If the degree of damping is so high that after the zero point has been passed the first graduation mark is no longer reached, the following zero point pulse will set counter 16a to zero via gate 22 and reset unit 19, so that no reading can be taken and the measurement must be repeated at a wider deflection.

If, however, phototransistor 14 does transmit pulses after the passage of the zero point, the first pulse will close gate 22 via control unit 21 so that further zero point pulses will no longer have an effect on reset unit 19. Throughout the measurement gage 22 is opened by a zero point pulse and closed by a pulse through a graduation mark, so that there is an automatic check on the adequacy of the deflection of arm 8.

The first pulse train produced by scale 11 is fed, via line 25 and gate 23, to the positive input of the counter circuit 16, while clock pulses from an oscillator 26 are fed to a time counter 27 via gate 24.

After a half vibration cycle a zero point pulse is transmitted which, with knob 15 placed in the settings "x4" and "x1," is stored in a flip-flop memory; after the third, or fifth, zero point pulse, so after one and two cycles, this memory transmits a control pulse. In setting "x16" the zero point pulse itself is used as a control pulse. Such a control pulse closes gate 23 and opens gate 28, which causes further pulse trains to be supplied to the negative input of counter circuit 16, with the result that the reading on counter 16a goes down. The following control pulse, which consequently corresponds with the third, fifth or ninth zero point pulse, closes all gates and thus terminates the measurement.

With this arrangement the number of pulses in the pulse trains is counted as follows:

setting "x16": addition of a half cycle, subtraction of a half cycle setting "x4": addition of one cycle, subtraction of one cycle setting "x1": addition of two cycles, subtraction of two cycles.

The time counter 27 operates throughout the measurement; the moment the number of measuring cycles, is chosen, the oscillator frequency is so switched that the counter will always indicate the cycle time in seconds.

If at the start of the measurement the arm 8 deflects too much, there may be a chance that the deflection over the first half cycle will exceed the value permitted by the scale. In that case an end pulse is obtained which, via a line 29 and the reset unit, returns the counter to zero. The end pulses, as also the above-mentioned zero point pulses, are supplied by switching units incorporated in a bridge 30.

For an accurate measurement it is required that the zero points of the movable parts and the scale coincide. This can be achieved by means of a setscrew 31, with which holder 4 can be rotated in a horizontal plane until zero line 38 on scale 11 is illuminated by lamp 12. This need not be done by sight, since for this purpose use can be made of the test position of switch 32 (FIG. 1), i.e. of the lowest position of said switch in FIG. 4; with the switch placed in this position the counter circuit 16 is not fed with measuring pulses but with clock pulses, so that upon termination of the measurement the counter is back at zero, provided, of course, the zero point has been properly adjusted. This test must take place over one cycle, so in the position "x16," because measurements over more cycles will always yield a result equal to zero.

Every time the zero position is passed, drive 9 imparts an impulse to shaft 2 and hence to the movable part. The drive is stopped as soon as the amplitude has become constant, after which the measurement can start. The drive is operated by means of a switch 37. When measurements at low frequencies are desired, weights can be fixed on inertia arm 7.

In the case of substances with high damping and low stiffness values, such as nonvulcanized, slightly cross-linked rubbers at room temperature, a rod 34 of known stiffness can be clamped between bracket 10 and a fixed point 33. Preferably, the rod is so mounted as to permit of rapid replacement. Such an added stiffness, for which the result of the measurement must, of course, be corrected, may enlarge the measuring range considerably.

During the measurement test specimen 1 is placed a closed space which is very accurately kept at a given temperature. The measuring temperature may, for example, be chosen between $-150°$ C and $+200°$ C. The space is provided with heat-insulating walls 35, some of which have been omitted in FIG. 1.

Reference 36 denotes an arrester button.

By means of an installation according to the invention $\Lambda_{max}$ can be measured with an accuracy which, for the settings "x16," "x4" and "x1" correspond to a deviation of at most $\pm 4$ percent, $\pm 2$ percent and $\pm 1$ percent of the actual values respectively.

At low dampings the air resistance has a considerable effect on the movement of the inertia arm. During measurements on metals at large amplitudes, the nonlinear deformation of the test specimen also has an effect. In examinations on polymers this is hardly noticeable. In the case of large cycle times ($>15$ sec) external vibrations and displacement of air may play a part.

Cycle times of between 25 and 0.25 sec can be measured with an accuracy of $\pm 0.5$ percent. With $t=<0.25$ sec, it is difficult to start the measurement at the correct moment.

The invention can also be used for measuring the damping of vibrations other than torsional vibrations, e.g. vibrations produced by imparting to a body one or several pulses which expose it to a bending or tensile (compressive) load.

The test specimen need not be a strip; it may also consist of a tube or the like.

What I claim is:

1. Apparatus for measuring the damping of torsional vibrations in visco-elastic materials, the apparatus being provided with clamps for fastening the ends of a test specimen, one of said clamps rigidly fixed from rotation, the other of said clamps being connected to an indicator for indicating the amplitude of torsional vibrations of said specimen, wherein said indicator comprises an indicator arm which is adapted to rotate freely, said arm carrying a scale having successive logarithmic graduation marks arranged on either side of a zero point thereon in which the interval between each two successive graduation marks is directly proportional to the distance to the zero point, said marks allowing light from a fixed light source to fall upon a fixed light detector connected to a counter mechanism for determining the decrease of the number of graduation marks passed in successive vibration periods.

2. Apparatus according to claim 1 wherein the width of the graduation marks increases with the distance to the zero point.